May 18, 1965   J. PANGBORN ETAL   3,183,818
AUTOMATIC FILM PROCESSING DEVICE
Filed Jan. 5, 1961   2 Sheets-Sheet 1

INVENTORS
Jack Pangborn
BY Warren E. Wheeler
Townsend and Townsend
attorneys

United States Patent Office 3,183,818
Patented May 18, 1965

3,183,818
AUTOMATIC FILM PROCESSING DEVICE
Jack Pangborn, 616 E. 10th St., and Warren E. Wheeler, 430 K St., both of Davis, Calif.
Filed Jan. 5, 1961, Ser. No. 80,925
7 Claims. (Cl. 95—89)

This invention relates to an automatic photographic film processing device.

The principal object of this invention is to provide a film processing device which will process sheet film stock by sequentially emerging the film sheets into respective baths of processing fluids.

One of the principal features of this invention is the provision of a unique device for periodically raising and lowering the film during the period that the film is processed within a particular solution to effect agitation.

Another feature and advantage of this invention lies in the fact that the mechanism can be constructed in a relatively small area and for a limited cost, thus rendering it practical for installations in doctors' offices where X-ray plate development is required, and small photography studios where a number of sheets of films must be periodically processed.

Another object of this invention is to provide a novel film carrying device which is adapted to carry a packet of film longitudinally down a track in association with a mechanism for raising and lowering the packet of film at any location along the track and without regard to the longitudinal movement of the film packet along the track.

Another feature and advantage of this invention is that the device of this invention is readily adaptable for changes in programming, thus enabling the device to be used for many different film processes requiring different sequences and time intervals.

A further feature and advantage of the invention is that the accurate timing required for critical development can be controlled in advance so that the entire filming process is carried out under precise and controlled timing conditions.

A further object of this invention is to provide novel means which allow the film carrying arm to be moved either in the forward or reversed direction and to any selected bath from the preceding bath. This has a feature and advantage of allowing the machine to be programmed to return the film to a bath in process which requires the film to be processed more than one time in a selected solution.

Another feature and advantage of this invention is the provision of a novel arm lifter mechanism which allows the film carrying arm to be lifted uniformly at any position along its longitudinal path of travel and to be moved longitudinally while in any position of elevation.

A still further feature and advantage of this invention is that the device can operate equally well to process single as well as multiple sheets of film.

Other objects and advantages of the present invention will become apparent upon reading the following specification and referring to the accompanying drawings in which similar characters of reference represent corresponding parts in each of the several views.

Figure 1:
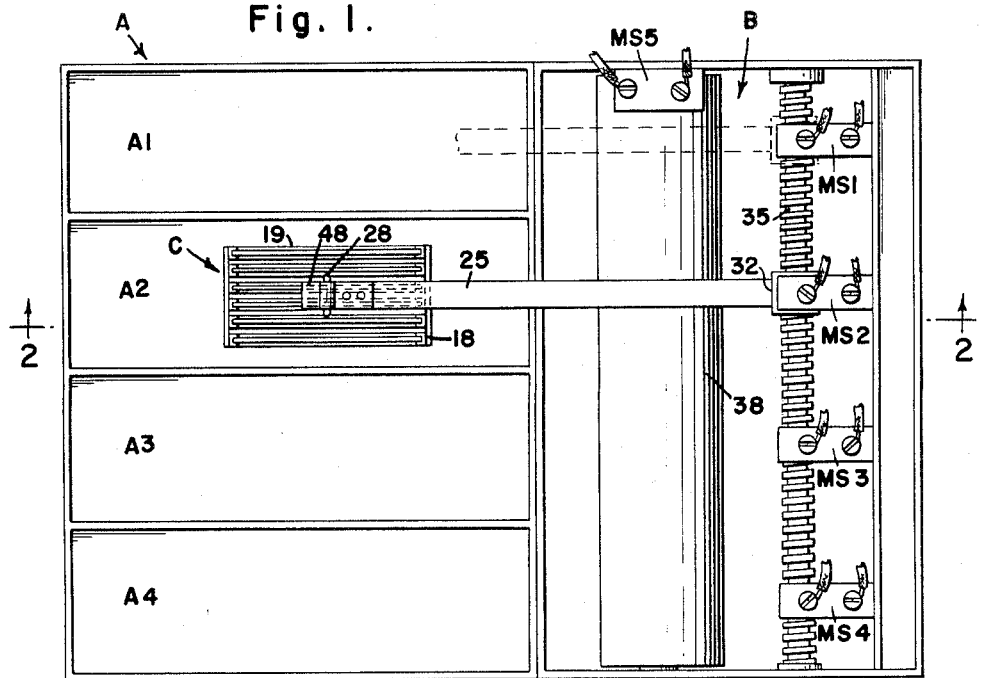
FIG. 1 is a top plan showing the principal embodiment of the invention.
Figure 3:
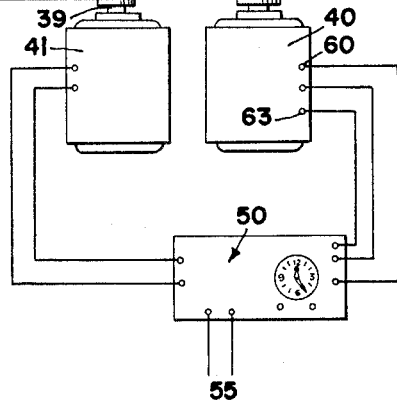
FIG. 3 is a perspective view of the film-carrying carriage used with the process unit of this invention.
Figure 3:
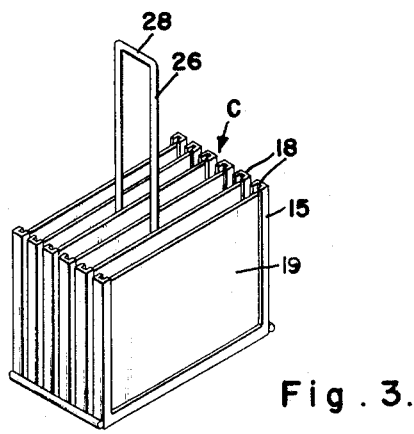
Figure 2:
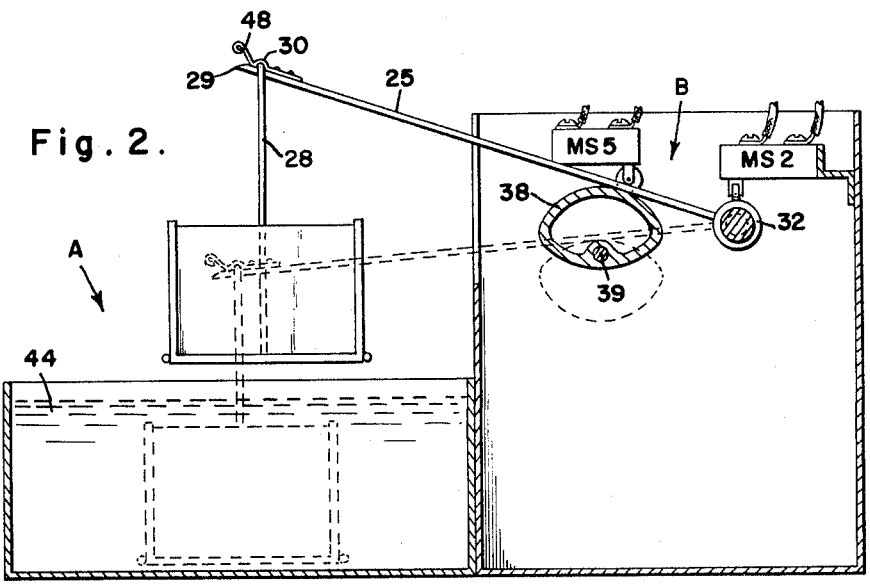
FIG. 2 is a cross-sectional view of FIG. 1 taken at line 2—2.

The principal embodiment of the invention comprises a row of processing tanks generally indicated at A in which the respective tanks are indicated as at $A_1$, $A_2$, $A_3$ and $A_4$. A film-pack carrying arm mechanism B is mounted alongside the row of tanks A which is arranged to carry a film pack C to each of the respective tanks or baths within the row of tanks and to raise and lower the film pack into and out of the solutions carried within each of the tanks. The film pack C comprises a plurality of multiple U-shaped frame members 15 mounted in spaced parallel relationship in which each spaced member 15 is provided with a slot or groove 18 into which a film plate 19 can be inserted. In this arrangement, each sheet of film 19 is held in spaced-apart parallel relationship so that a working solution can contact all faces of the film sheet when the film pack C is submerged in the solution.

The film pack C is supported from an arm 25 of mechanism B by a vertical support 26. The top of support 26 forms a round shaft as indicated at 28 which is pivotally connected to the end 29 of arm 25 by a bearing 30. The opposite end of arm 25 is connected to a bearing sleeve 32 mounted on a threaded shaft 35. Sleeve 32 is arranged to move longitudinally along shaft 35. The inner-face of sleeve 32 is provided with threads which engage the threads on shaft 35 and allow the arm 25 to be pivotally moved relative to shaft 35. Rotation of shaft 35 will cause the arm 25 to move along the shaft. Obviously, reverse rotation of the shaft will cause the arm to move in an opposite direction. Thus, the connection between arm 25 and shaft 35 allows for the up and down movement of the arm as well as its longitudinal travel.

A cam roller 38 is mounted under arm 25 between its ends in order to support the arm. The cam is pivotally mounted on shaft 39 for rotation in such a way as to cause the arm to move up and down in conformance with the contour of the cam roller. Cam roller 38 extends the entire length of travel of arm 25 on shaft 35 and is mounted in parallel relationship to shaft 35. The surface of the cam 38 is smooth so that arm 25 can ride along the cam roller.

The respective tanks $A_1$, $A_2$, $A_3$ and $A_4$ are mounted adjacent arm mechanism B and under the end of arm 25 so that film pack C will be enabled to travel over the respective tanks. A motor 40 is connected to shaft 35 and is arranged to rotate the shaft in order to effect longitudinal motion of arm 25 and film pack C. A motor 41 is connected to shaft 39 and is arranged to rotate cam 38. The contour of cam 38 is formed so that when the cam is rotated to a high area, arm 25 is raised to a sufficiently high position so that the bottom of film pack C completely clears the top wall of the respective tanks $A_1$ through $A_4$. When the cam is rotated to its lower-most position, the arm is lowered to a position where the bottom of film pack C is supported slightly above the bottom of a respective tank and the top of the film pack is below the surface of liquid solution 44 within the respective tanks.

The device operates by first filling the respective tanks $A_1$ through $A_4$ with the proper developing, washing and fixing solutions. The films to be developed are mounted within groove 18 of film pack C and film pack C is then mounted within bearing 30 on end 29 of arm 25. A clip 48 is arranged to allow for the removable mounting of shaft 28 within bearing 30. Motor 40 was previously rotated to a point where arm 25 is brought to a position above tank $A_1$, while motor 41 was actuated to move cam 38 to a position for a maximum elevation of arm 25. In this position film pack C is held above tank $A_1$. In order to effect the developing, motor 41 is actuated to cause cam 38 to rotate and lower arm 25. This causes film pack C to be dumped into solution 44 within tank $A_1$. Periodically cam 38 can be rotated to cause film pack C to be raised up and down relative to the solution. This will afford agitation which is generally necessary in photographic processing.

At the time of transfer of the solution from tank $A_1$ to $A_2$, cam 38 is moved to cause arm 25 to be raised to its uppermost position and shaft 35 is rotated to effect the longitudinal movement of arm 25 to a position where film pack C is directly over tank $A_2$. Subsequently, cam 38 is again rotated to lower the film pack into the solution in tank $A_2$. The process is then repeated in such a way that the film pack progressively is moved to the various tanks for the required periods of time. It is observed that if it is desired to move the film pack to a solution that it had been previously processed in, it is only necessary to reverse the action of motor 40 during the interval that cam 38 is holding arm 25 in its elevated position. Furthermore, it is also important to note that it is not necessary that the film pack be arranged to be submerged in the tanks in their geographic order. The device can be programmed to cause the film pack to be moved to any tank from any other selected tank without contact with an intermediate tank. It is of course obvious that the device as shown in the drawings would have to be utilized in a dark room for photographic processing. However, a suitable cover may be mounted over the device to prevent light from entering the tank area so that the device once loaded can be used under normal conditions of illumination.

While in the drawings only four tanks are shown, it is believed obvious that the number of tanks can be extended indefinitely in order to provide all the different solutions that may be required for a complex photographic process, such as used in color processing.

The operation of the device has been described in reference solely to manual control where motors 40 and 41 would be turned on and off or reversed according to the judgment of the operator. It may be desirable to operate the machine automatically, and in such event a timing unit 50 can be connected to the respective motors 40 and 41. Timing unit 50 can control the programming and the time sequence for the movement of film pack C to its respective positions and to effect the timed agitation by the periodic lifting of the pack from the solution. The timing and the programming may be done by any of the many varieties of timing and programming switching devices. For example, cams can be mounted on shafts 35 and 39, or mechanical switches can be arranged to accomplish this function.

Figure 4:
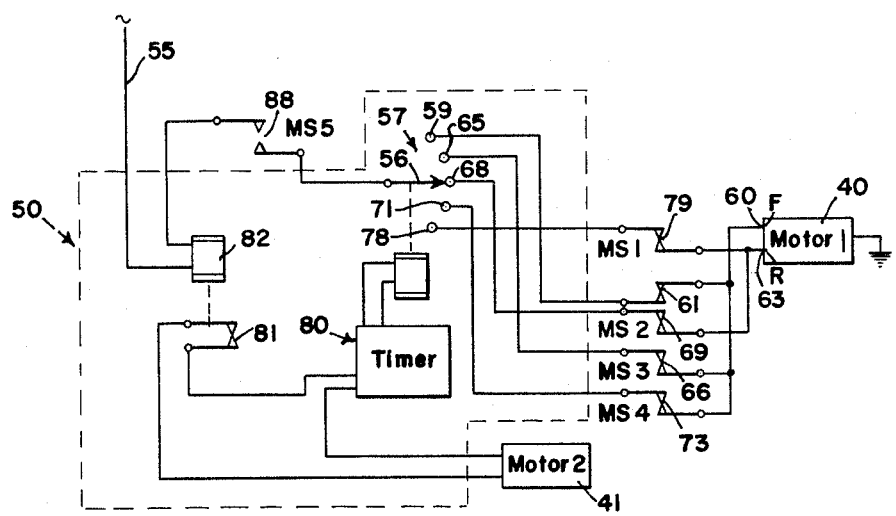
FIG. 4 is a schematic showing an electrical circuit adapted to create a selected program for the device.

In FIG. 4 there is provided an illustrative circuit for effecting the programming and timing. A plurality of microswitches $MS_1$, $MS_2$, $MS_3$, and $MS_4$ are mounted on the arm mechanism B in a position to be actuated by sleeve 32. Switch $MS_1$ is in a position to be actuated when arm 25 is directly in line with the center line of tank $A_1$. Switch $MS_2$ is similarly aligned to be actuated when arm 25 is over tank $A_2$, and switches $MS_3$ and $MS_4$ are similarly aligned relative to tanks $A_3$ and $A_4$ respectively.

Power from a power source 55 is fed to the wiper 56 of a stepping relay 57. The first terminal 59 is connected through normally closed contact points 61 to a forward terminal 60 of motor 40. The second terminal 65 of switch 57 is connected through normally closed contact points 66 to the forward terminal 60 of motor 40. A third terminal 68 is connected through normally closed contact points 69 of switch $MS_2$ to the reverse terminal 63 of motor 40. A fourth terminal 71 is connected through normally closed contact points 73 of switch $MS_4$ to the forward terminal 60 of motor 40. The last terminal 78 of stepping relay 57 is connected through normally closed contact points 79 of switch $MS_1$ to the reverse terminal 63 of motor 40.

The stepping relay is operated by pulses from a conventional timer unit 80. Motor 41 is also actuated by timer 80 through normally closed relay contact points 81 of a relay 82. Relay 82 is in series with the power line 55 supplying power that energizes motor 40 in such a way that the relay 82 will cause relay contact points 81 to open only during the interval that motor 40 is being driven. Microswitch contact points 88 of switch $MS_5$ are arranged in series with the main power line 55 in the circuit supplying power through motor 40 through stepping relay 57. Microswitch $MS_5$ is arranged to be actuated to close relay contact points 88 only when the cam 38 is in its upper position so as to cause arm 25 to be raised. It can thus be seen that in normal operation, timer 80 is connected to normally actuate motor 41 on command so that periodically the motor will operate to cause the raising and lowering of arm 25. The timer also functions to periodically advance the wiper through the respective terminals 59, 65, 68 and 78. When the wiper is in contact with the last terminal 78 and cam 38 is moved to its upper position, switch contact point 88 of microswitch $MS_5$ will close causing the breaking of the circuit to motor 41, thus stopping further movement of the cam through energization of relay 82 by the provision of a circuit through the now closed contact point 88 of microswitch $MS_5$ through terminal 71 of stepping relay 57 and normally closed contact point 79 of microswitch $MS_1$. This supplies power to the reverse terminal 63 of motor 40, thus causing the motor to move arm 25 in a reverse direction until $MS_1$ is contacted and moved to open contact point 79. This stops the current flow in the motor supply line 55. Therefore, relay contact point 81 will be closed so that motor 41 can be energized sequentially to cause the raising and lowering of arm 25. In this condition the arm is loaded with a film pack C and the machine is turned on. The sequence of operation starts and after a predetermined time during which motor 41 sequentially causes the raising and lowering of film pack C in the solution in tank $A_1$ which may be a developer. Timer 80 then advances stepping relay 57 to the first terminal 59. Thereafter, as soon as motor 41 moves cam 38 to its raised position, the circuit is formed through contact point 61 of microswitch $MS_2$ to the forward terminal 60 of motor 40 which causes the motor to advance the arm in the forward direction until microswitch $MS_2$ is moved to its open condition by contact with the sleever 32 of arm 25. The circuit to motor 41 is then conditioned to cause the raising and lowering of the film within the solution in tank $A_2$. After a predetermined time interval, determined by timer 80, the wiper will advance to the second terminal 65, and here again, after arm 25 is raised a circuit will be created to forward terminal 60 of motor 40 through contact point 66 of microswitch $MS_3$. When the arm advances to a position in alignment with tank $A_3$, microswitch $MS_3$ will open and the circuit to motor 41 will again be conditioned to allow the raising and lowering of arm 25. After a predetermined time interval, the wiper will advance to third terminal 68. This will cause the reverse terminal 63 of motor 40 to be energized after microswitch $MS_5$ is closed so that arm 25 will then reverse from tank $A_3$ to tank $A_2$. When the arm is aligned with tank $A_2$, microswitch $MS_2$ will open and again the circuit to motor 41 will be in condition to cause the raising and lowering of the film within tank $A_2$. After a proper amount of time in tank $A_2$, the stepping relay switch 57 will advance to the next contact point 71 where a circuit will be created to the motor through microswitch $MS_4$. The arm will then advance past tank $A_3$ and to alignment with tank $A_4$ where microswitch $MS_4$ will then open, breaking the circuit to motor 40. Here again the circuit to motor 41 is energized to cause the raising and lower of arm 25. This allows the film to be processed within tank $A_4$ for the predetermined period. After the period, stepping switch 57 will move to the last contact terminal 78 which causes the circuit through microswitch $MS_1$ to the reverse terminal 63 of the motor which will cause the arm to go back to its starting position in alignment with tank A₁. It can thus be seen that a great deal of flexibility as to the programming of the film plates in the various solutions can be obtained. The circuit described is merely illustrative of one of the many possible combinations which may be constructed to effect programming and timing of the film within each of the baths. It is also obvious that the rate of agitation affected by the raising and lowering of arm 25 can be precisely controlled to effect either frequent or infrequent cycles of raising and lowering of the film within the respective solutions. This flexibility is particularly important in the processing of films where the film is processed in the same solution during several phases of the processing steps.

Although the foregoing invention has been described in some detail by way of illustration and example for purposes of clarity of understanding, it is understood that certain changes and modifications may be practiced within the spirit of the invention as limited only by the scope of the appended claims.

In the claims:

1. A device for processing photographic materials comprising: a horizontal track, an arm, means to mount said arm for vertical pivotal movement on said track and for longitudinal movement along said track, a longitudinal surface mounted in supporting relationship under said arm extending the length of said track and mounted in parallel relationship thereto, means to move said longitudinal surface to an upper and lower position to cause said arm to move to upper and lower positions, a plurality of photographic solution carrying tanks mounted under the free end of said arm and registered so that the free end of said arm passes directly over each of said tanks as the arm is moved longitudinally along said track, means to suspend photographic material from the free end of said arm to a depth sufficient to cause the photographic material to be submerged in solutions carried by the said tanks when said arm is in the lower position and to be positioned above the top wall of the tanks when said arm is in the upper position, and means to move said arm into registration with each of said tanks.

2. A device for processing photographic material according to claim 1 having timing means to cause the longitudinal movement of said arm along said track during intervals when said arm is maintained in its upper position to allow photographic material carried by said arm to pass freely over the top walls of said tank during transfer of alignment from one to another.

3. A device for processing photographic materials according to claim 1 and wherein said arm supporting surface comprises an eccentrically mounted drum.

4. A device for processing photographic materials comprising: a plurality of open tanks mounted in side by side relationship, an arm, arm mounting means mounting said arm for slidable movement across the tops of said tanks, said arm being pivotally mounted for upward and downward movement relative to said tanks on said arm mounting means, an elongated cam drum rotatably mounted under said arm, cam rotating means to cause said cam drum to rotate to cause the raising and lowering of said arm, said cam drum forming a slidable surface to allow said arm to be slid longitudinally along said cam drum when moved along said arm mounting means, arm moving means to move said arm in registration with the respective said tanks, and photographic material carrying means depending from said arm at a position which will allow photographic material within said material carrying means to be below the top level of the tanks when said arm is in the lower position and to be above the top of the walls of the tanks when said arm is in the upper position.

5. A device for processing photographic materials comprising: a plurality of open tanks mounted in side by side relationship, an arm, arm mounting means mounting said arm for slidable movement across the tops of said tanks, said arm being pivotally mounted for upward and downward movement relative to said tanks on said arm mounting means, an elongated cam drum rotatably mounted under said arm, cam rotating means to cause said cam drum to rotate to cause the raising and lowering of said arm, said cam drum forming a slidable surface to allow said arm to be slid longitudinally along said cam drum when moved along said arm mounting means, arm moving means to move said arm in registration with the respective said tanks, photographic material carrying means depending from said arm at a position which will allow photographic material within said material carrying means to be below the top level of the tanks when said arm is in the lower position and to be above the top of the walls of the tanks when said arm is in the upper position, and control means operable to time the actuation of said arm moving means only during the interval that said cam drum is in a position to hold said arm in the raised position.

6. A device for processing photographic materials comprising: a plurality of tanks mounted in side by side relationship having their top walls disposed in coplanar relationship, a track mounted alongside said row of tanks in parallel relationship thereto, an arm pivotally and slidably mounted on said track, a drum mounted under said arm between said track and said tanks, said drum extending the length of said track and being mounted in parallel relationship thereto, means to eccentrically rotate said drum to a first position with said arm extending in an upward position and to a second position with said arm extending in a lower position, the elevation of said arm in said lower position being above the top edges of said tanks, and means to suspend photographic material from the end of said arm over said tanks, said means carrying said photographic material depending from said arm a sufficient distance to be submerged substantially below the top wall of said tanks when the arm is in the second position and to extend above the top wall of the tanks when said arm is in the first position, and means to longitudinally move said arm along said track to positions in alignment with each of said tanks.

7. A device for processing photographic materials comprising: a horizontal track, an arm, means to mount said arm for vertical pivotal movement on said track and for longitudinal movement along said track, a longitudinal surface including camming means mounted in supporting relationship under said arm extending the length of said track and mounted in parallel relationship thereto, means to move said longitudinal surface to cause said camming means to move to upper and lower positions to cause said arm to move to upper and lower positions, a plurality of photographic solution carrying tanks mounted under the free end of said arm and registered so that the free end of said arm passes directly over each of said tanks as the arm is moved longitudinally along said track, means to suspend photographic material from the free end of said arm to a depth sufficient to cause the photographic material to be submerged in solutions carried by the said tanks when said arm is in the lower position and to be positioned above the top wall of the tanks when said arm is in the upper position, and means to move said arm into registration with each of said tanks.

References Cited by the Examiner

UNITED STATES PATENTS 2,194,345    3/40    Winans _____ 95—89

NORTON ANSHER, *Primary Examiner.*

EVON C. BLUNK, DELBERT B. LOWE, *Examiners.*